Dec. 31, 1946. J. E. WAINWRIGHT ET AL 2,413,533
SCREW THREAD GAUGE
Filed May 17, 1943 3 Sheets-Sheet 1
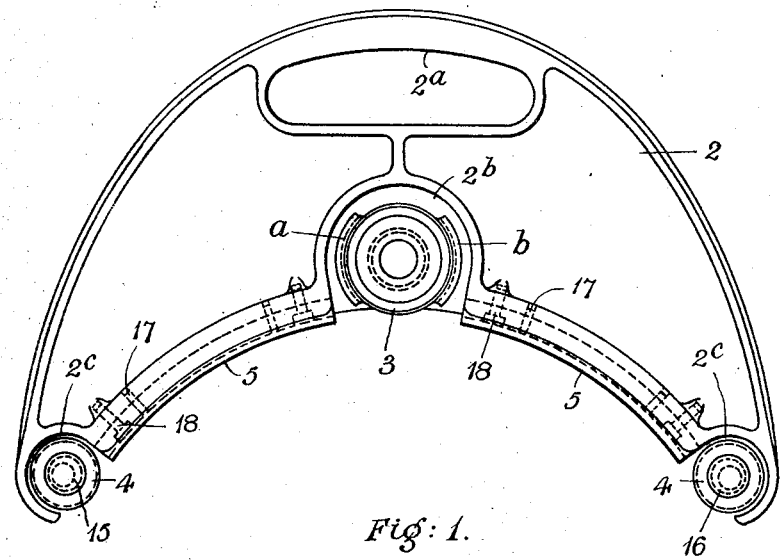
Fig: 1.
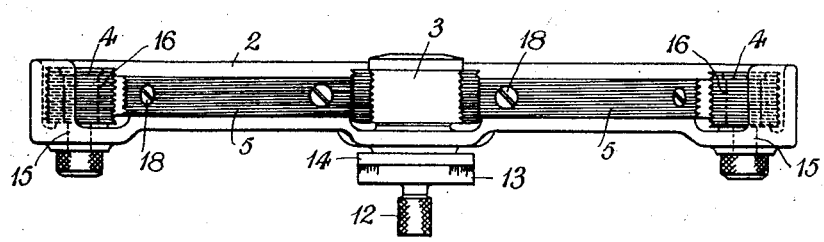
Fig: 2.
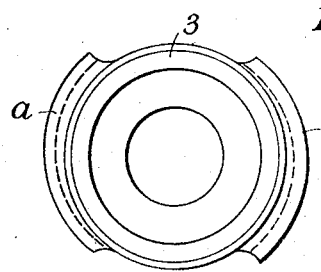
Fig: 3.
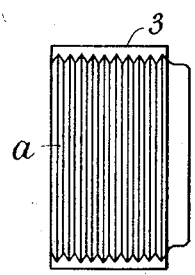
Fig: 4.

Dec. 31, 1946.   J. E. WAINWRIGHT ET AL   2,413,533
SCREW THREAD GAUGE
Filed May 17, 1943   3 Sheets-Sheet 3
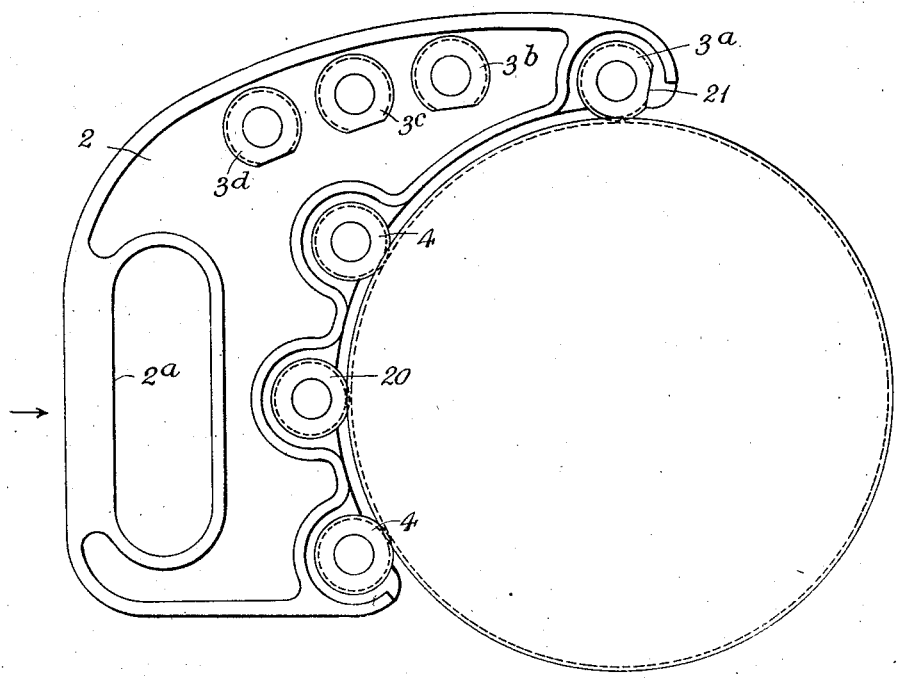
Fig:8.
Inventors
John E. Wainwright
Morgan Jellis
by Babcock + Babcock
Attorneys Patented Dec. 31, 1946

2,413,533

UNITED STATES PATENT OFFICE 2,413,533

SCREW-THREAD GAUGE

John Ernest Wainwright, Hunningham, near Leamington Spa, and Morgan Jellis, Peterborough, England, assignors to Coventry Gauge & Tool Company Limited, Fletchamstead, Coventry, England Application May 17, 1943, Serial No. 487,320
In Great Britain June 27, 1942

2 Claims. (Cl. 33—199)

This invention relates to the gauging of circular or partly circular work and has for its object to provide gauges for this purpose having certain advantages in the matter of manufacture and use as compared with the orthodox types of gauge.

The gauging of circular or partly circular work according to this invention involves the use of a gauge which is distinguished from the orthodox types of gauge as at present used for the same purposes, viz.: ring and plug gauges, in that it is adapted at each gauging operation, to make contact at at least three points with a minor segmental portion of the peripheral face of the work-piece, or of a rounded portion of the work-piece, of such limited extent as not to include the diameter of the work-piece, the gauge being successively applied to the peripheral face of the work-piece at a number of points entirely around said face or the rounded portion thereof.

For the purposes of the invention the improved gauge comprises a gauge body, means carried thereby for locating the gauge in gauging position on the work-piece, and a gauging member mounted in said body and adapted to be moved relatively thereto into and out of engagement with the work-piece, said locating means and gauging roller being arranged to make contact over a portion only of the complete periphery of the work-piece at each gauging operation.

The invention may be applied to gauges for use in gauging internal as well as external diameters and in either case for gauging plain, serrated or screw-threaded surfaces.

The improved gauges also include means for actuating the movable gauging member and for indicating the degree of error in the work-piece.

In the accompanying drawings:

Figure 1 is a view in side elevation of one form of the improved gauge for gauging external screw-threaded work.

Figure 2 is an underside plan view thereof.

Figures 3 and 4 are detail views in end and side elevation respectively and on a larger scale of the gauging roller.

Figure 8 is a view in side elevation illustrating an alternative arrangement of the gauging and locating rollers as embodied in a gauge for gauging external screw-threaded work-pieces.

In the embodiment of the invention shown in Figures 1 and 2, for gauging external screw-threaded work-pieces, 2 represents the body of the gauge, 3 the gauging roller, 4, 4, contact locating rollers, and 5, 5, clearance locating shoes or pads. The body 2, as shown is of substantially crescent form with an opening $2^a$ near the convex edge to form a handle, and with recesses $2^b$, $2^c$ in its inner or concave edge to accommodate the gauging and contact locating rollers 3 and 4 respectively. The said concave edge is shaped to conform more or less closely with the periphery of the work-piece.

The gauging roller 3, shown separately in Figures 3 and 4, is rotatable in the gauge body and is formed with two peripheral portions or sectors $a$ and $b$, one of which may determine the "go" and the other the "not go" limits of tolerance. If desired, there may be a third sector arranged for presentation to the work-piece in advance of the "go" sector to enable the operator to know when he is approaching the high limits and to relieve wear on the "go" sector. For grading purposes there may also be another sector between the "go" and "not go" sectors. Alternatively, as represented in an exaggerated manner in Figures 3 and 4, each of said sectors $a$, $b$ may be of progressively increasing diameter in the direction in which the roller is rotated for gauging purposes. In this case the minimum diameter of an intermediate zone of each sector determines the low limit and the maximum diameter of said zone the high limit of tolerance for the work-piece, one of said sectors being formed with annular serrations of full screw-thread form and the other sector with annular serrations adapted for gauging the effective diameter of the screw-thread on the work-piece.

Figure 7:
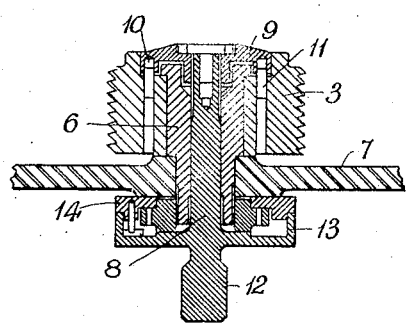
Figure 7 is a detail view in axial plane section and on a larger scale of one form of mounting for the gauging roller.

One way of mounting the gauging roller is shown in the detail sectional view, Figure 7, from which it will be seen that the said roller 3 is rotatably carried by a bearing bush 6 fixed transversely in the end wall 7 of the recess $2^b$ in the gauge body. The said roller is rotated by means of a spindle 8 which is free to turn in the said bush and is in detachable operative connection at one end with the roller by means of a removable cap 9 which is splined to the spindle and is formed with holes 10 for engagement with dowels 11 carried by the roller. The other or outer end of the said spindle is formed with a knob 12 and also with a flange 13 having a calibrated periphery co-operating with a fixed flange 14 on the bush 6 having a datum mark. The flange 14 may be secured in fixed position adjacent the wall 7 by a body or spacing collar rigidly secured to the bush 6 and formed with a lateral or radial flange overlying the flange 14 and engaging and connected to the same in any known suitable manner to hold the same against relative movement and having an axially extending flange extending toward and engaging or substantially engaging the inner face of the knob 12 to properly space the flange 13 thereof with respect to stationary flange 14. An eccentrically disposed pin may be secured in said spacing collar to extend therefrom axially toward and closely adjacent to the inner face of the knob 12 which may be formed with a stop lug to contact the adjacent end portion of said stop pin to limit the turning movement of said knob 12 to very slightly less than one complete revolution in either direction to facilitate a quick change with certainty from sector $a$ to sector $b$ or vice versa. The angular position of the gauging roller on the bush with respect to the spindle and hence to the calibrated flange 13 can be adjusted at will by removing the cap 9, rotating the spindle 8 and re-engaging the cap in a different angular position on the splined end of the said spindle.

The contact locating rollers 4 are each rotatably mounted in the gauge body about transverse axes and are formed with annular serrations of substantially screw-thread form. For the purposes of adjustment for wear each locating roller is mounted on an eccentric portion 15 of a pin 16, said pin being angularly adjustable and capable of being locked in the gauge body or frame 2.

In addition to the contact locating rollers 4, helix locating shoes or pads 5 are arranged between the gauging roller 3 and each of the rollers 4, said shoes being themselves located in position on the concave edge of the gauge body by means of dowels 17 and secured thereto by screws 18. The concave side of each shoe is formed with screw threads adapted to fit with clearance into the screw-thread on the work-piece to locate the gauge accurately in position thereon.

Figure 5:
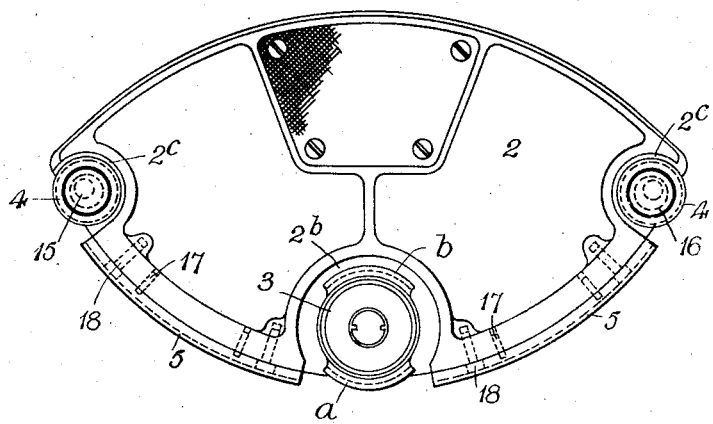
Figures 5 and 6 are views similar to Figures 1 and 2 respectively of the improved gauge as adapted for gauging internally screw-threaded work.
Figure 6:
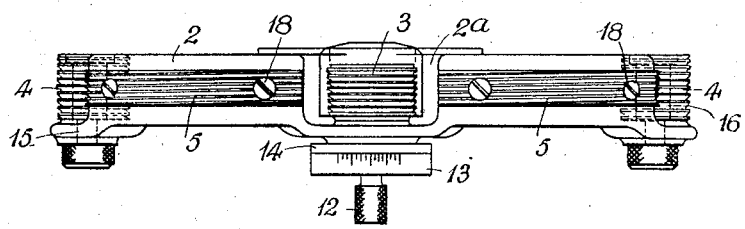

Before applying the gauge to the work-piece the gauging roller 3 is turned into the position shown in Figure 1. The gauge is then placed in gauging position with the screw threads on the shoes and the annular serrations on the locating rollers in correct clearance and contact engagement respectively with the screw-thread on the work-piece. The gauging roller is then turned about its axis to bring the first sector $a$ into engagement with the screw-thread to check the effective diameter of the thread after which, the gauging roller is next turned to bring the second sector $b$ into position to gauge the full form of the thread. The degree of error in each case is indicated by the angular position of the calibrated flange 13 with respect to the datum mark on the fixed flange 14, there being two sets of calibrations one at each side of the said flange 13, as seen in Figure 2, for the two readings, the calibrations in the one case being in the reverse order to the other. If, for example, the effective diameter of the thread under inspection, as indicated at one side of the calibrated flange 13, is, say, .002" below maximum and on turning the gauging roller to the full form position, the reading at the other side of said flange is, say, three divisions more than at the first side, then the error in the form is .003". The full form error is calculated by adding this .003" to the effective error (—.002") giving, in this case, .001" full on diameter. A number of such readings will be taken at different angular positions around the periphery of the work-piece. As already stated, the invention is equally applicable to a gauge for gauging internal screw threads and one such embodiment is shown in Figures 5 and 6. In this case, of course, the effective edge of the gauge body 2 will be convex and of a diameter appropriate to the internal diameter of the work-piece. In other respects the construction and use of the gauge will be substantially similar to that above described for external gauging, 3 representing the gauging roller, 4, 4, the contact locating rollers and 5, 5, the clearance helix locating shoes.

Neither for external nor for internal gauging is it essential according to the present invention for the gauging roller 3 to be arranged between the contact locating rollers 4 or the shoes 5. For example, as shown in Figure 8, the gauging roller 3 may be arranged at one of the horns of the gauge body and a clearance helix locating roller 20, or, alternatively, a clearance helix locating segmental shoe may be arranged between the two contact locating rollers 4, the arrangement being preferably such that application of the gauge to the work-piece in the direction of the arrow does not adversely affect the feel of the gauging roller. In this case the shape of the gauge body may be modified as shown.

Nor is it essential in any case for the complete gauging operation to be performed with one gauging roller. Each gauge may, as shown, for example, in Figure 8, be provided with a set of gauging rollers $3^a$, $3^b$, $3^c$ and $3^d$ one for determining the "go" and "not go" limits for the major diameter of the screw-threaded work-piece, one for determining the "go" and "not go" limits for the effective diameter of the screw-thread, a third for determining the "go" and "not go" limits of the core diameter of the screw-thread and a fourth as a final check on all dimensions. Those gauging rollers of the set which are not in immediate use may, as shown, be conveniently and removably mounted in the body 2 of the gauge. Each of the gauging rollers is preferably formed with a flat 21 to enable it to be removed from its supporting pin while the gauge is in position on the work-piece.

Where the improved gauges are employed for gauging screw-threaded work as herein described with reference to the examples shown, a limited degree of axial play may be allowed to the contact locating rollers 4. As an additional or alternative safeguard the gauge may be provided with eccentrically mounted conical ended pins set in such a manner in the gauge body as to ensure correct seating of the gauge on the work-piece.

It is, of course, to be understood that the invention is equally applicable for the gauging of the diameter of work-pieces having plain surfaces as to those that are screw-threaded or otherwise formed, and in such cases the locating and gauging rollers would be formed with plain peripheries. For gauging the circularity of a work-piece and for other purposes, such as grading, the gauging member may take an eccentric or spiral form in cross-section.

We claim:

1. A gauge for the purposes described comprising a gauge body, means carried thereby to contact the work for locating the same in gauging position on the work, and a gauging roller rotatably mounted in said body and having gauging sectors around its periphery adapted on rotation of said roller for successive engagement with the work, each of said sectors being of progressively increasing radius in the direction in which the roller is rotated for gauging purposes, one of said sectors being formed with annular serrations of full screw-thread form and the other sector with annular serrations adapted for gauging the effective diameter of a screw-thread, said locating means and gauging roller being arranged to make contact over a portion only of the complete periphery of the work at each gauging operation.

2. A gauge for the purposes described comprising a gauge body, shoes carried thereby to contact the work for locating the gauge in gauging position on the work, said shoes being formed with portions of screw-threads of the same pitch and sense as that of a screw-thread on the work, and a gauging roller rotatably mounted in the gauge body and having gauging sectors around its periphery adapted on rotation of said roller for successive engagement with the work, each of said sectors being of progressively increasing radius in the direction in which the roller is rotated for gauging purposes, one of said sectors being formed with annular serrations of full screw-thread form and the other sector with annular serrations adapted for gauging the effective diameter of a screw-thread, said locating means and gauging roller being arranged to make contact over a portion only of the complete periphery of the work at each gauging operation.

JOHN ERNEST WAINWRIGHT.
MORGAN JELLIS.